Nov. 10, 1964  J. C. KIEFER ETAL  3,156,339
CREDIT MECHANISM

Filed Aug. 25, 1961  4 Sheets-Sheet 1

INVENTORS:
JACOB C. KIEFER
HERMAN G. JENSEN
BY Carl N. Lloyd
ATTY.

Nov. 10, 1964

J. C. KIEFER ETAL 3,156,339

CREDIT MECHANISM

Filed Aug. 25, 1961

INVENTORS:
JACOB C. KIEFER
HERMAN G. JENSEN

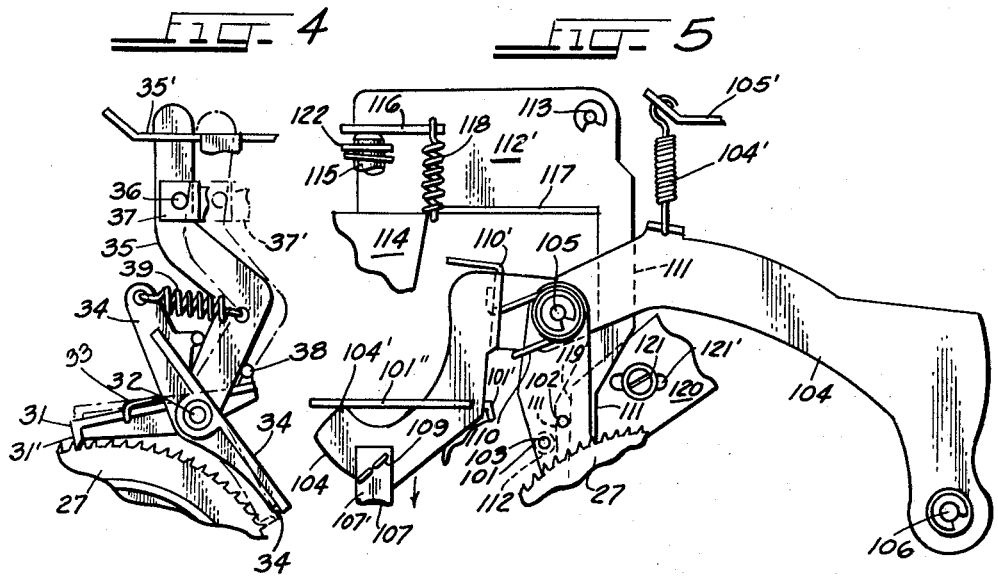
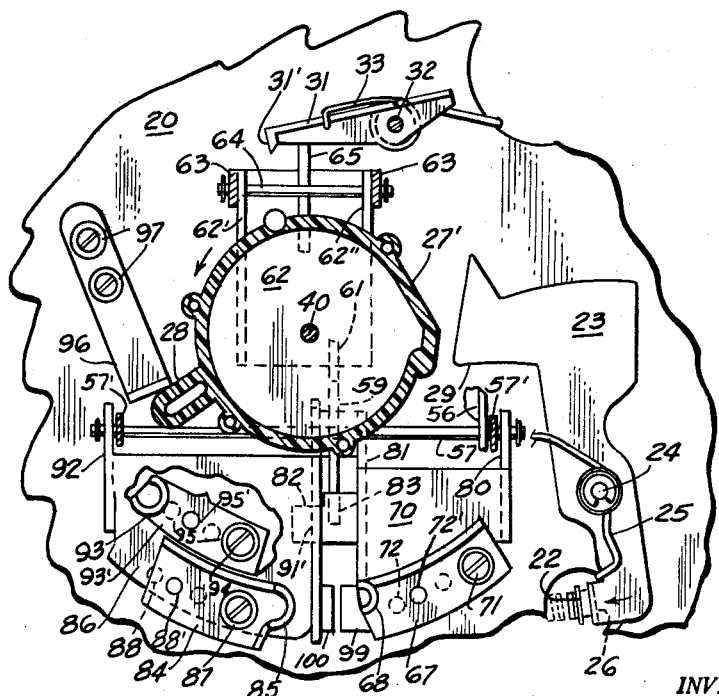

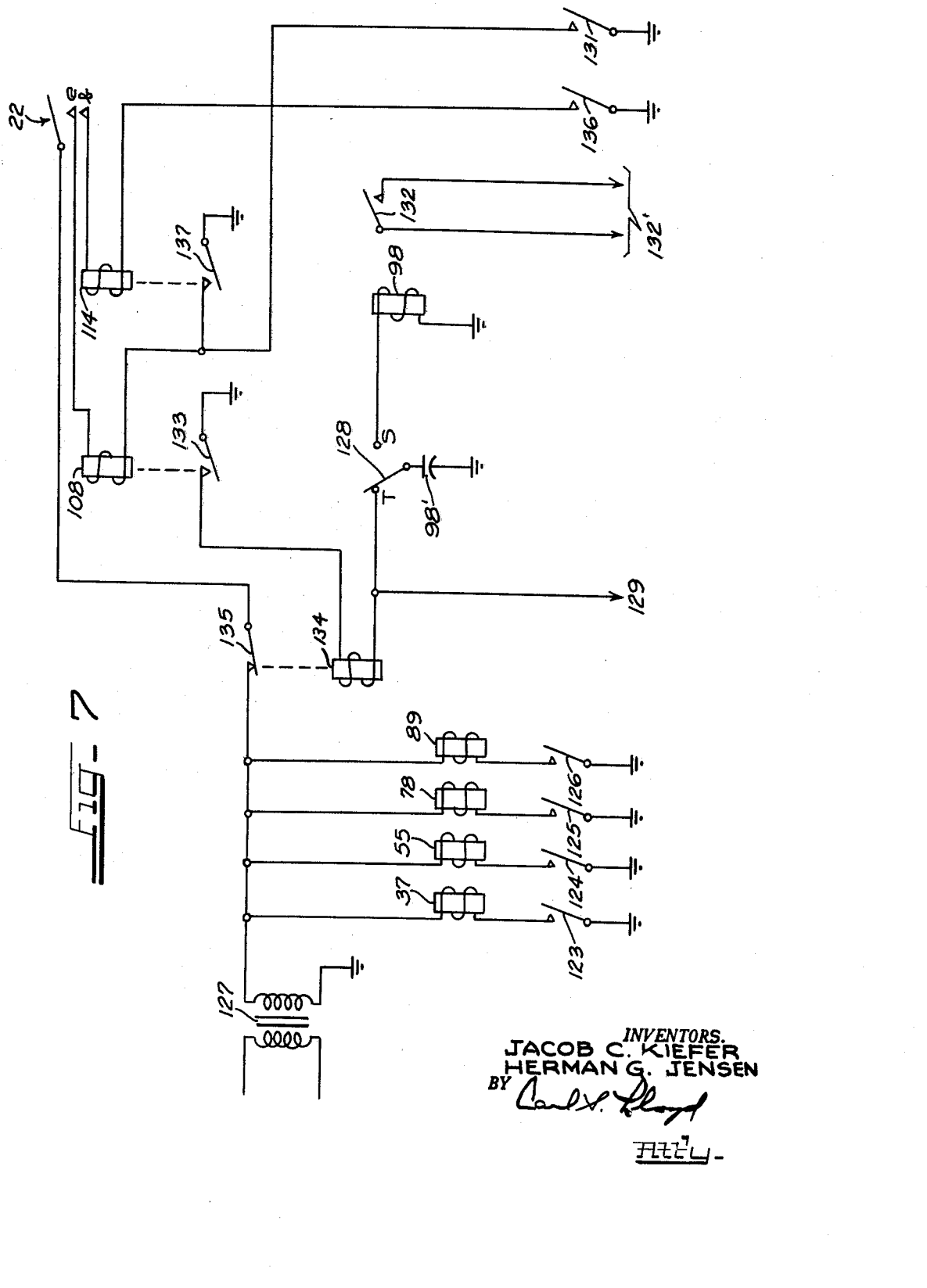

United States Patent Office

3,156,339
Patented Nov. 10, 1964

3,156,339
CREDIT MECHANISM
Jacob C. Kiefer and Herman G. Jensen, both of Chicago, Ill., assignors to The Seeburg Corporation, Chicago, Ill., a corporation of Delaware
Filed Aug. 25, 1961, Ser. No. 134,007
11 Claims. (Cl. 194—1)

This invention relates to an improved credit mechanism for use in coin-operated apparatus such as phonographs and vending machines.

More specifically our invention relates to a mechanism for establishing a predetermined number of credits dependent upon the value of deposited coins and for maintaining an associated coin-controlled apparatus in operative condition until full value has been received by a customer.

Such devices are generally designed to provide a fixed number of credits upon the deposit of a given coin so that if it is desired to change the credit ratios, i.e., the number of credits to be given for a particular coin, a different mechanism must be substituted. Taking coin-controlled phonographs as an example, in one geographical area it may be desirable to provide credit for one musical selection upon deposit of a nickel, two credits for a dime, five for a quarter, and ten for a half-dollar, whereas in other areas it might be desirable to provide six credits for a quarter and twelve or more credits for a half-dollar or other variations in the credit ratios. Furthermore adjustability of the credit ratios is important where the coin-controlled apparatus is distributed in countries other than the United States since the value of the coins of different countries varies. Credit mechanisms of various types have been used by manufacturers of coin-operated machines but, so far as we are aware, none of them has been so constructed as to satisfactorily provide for ready and simple change of credit ratios to meet such conditions, particularly for four coin operation.

Other undesirable limitations in prior credit mechanisms relate to the number of coins of different denominations which can be used and also to the total number of credits which can be accumulated. In addition, such apparatus generally embodies mechanism for subtracting a single credit for the reproduction of a musical selection (taking coin-operated phonographs as an example) and cannot be varied as might be desired, for example, where both regular and long-playing records are available for selection.

The primary object of this invention is to provide a credit mechanism of generally improved construction and more particularly one which is adapted to overcome the above-stated limitations. Such mechanism is adapted to receive coins of various denominations and permits individual adjustment of the number of credits given for coins of a particular denomination.

A further object of the invention is to provide a credit mechanism which is extremely accurate and efficient in operation and which is relatively inexpensive to manufacture and maintain.

A still further object is to provide a credit mechanism embodying multi-pricing means which in a single operation will subtract one or more credits depending upon the value received by a customer.

The above and other objects and advantages of the invention will be apparent from the following description of a preferred embodiment thereof, taken in conjunction with the accompanying drawings, in which:

FIG. 4 is a detail view illustrating the escapement mechanism of the device with elements thereof shown in each of two operative positions;

FIG. 5 is a detail view of the credit-subtracting mechanism of the device;

FIG. 6 is a fragmentary elevational view, partly in section, taken approximately along the line 6—6 of FIG. 3, with certain parts removed for purposes of clarity; and FIG. 7 is a simplified schematic wiring diagram of certain of the electrical elements of an automatic coin-controlled phonograph having our credit mechanism incorporated therein.

A preferred embodiment of the invention will now be described in relation to such a phonograph, but it will be understood that our mechanism also has utility in connection with various other types of apparatus, such as merchandise vending machines.

Figure 1:
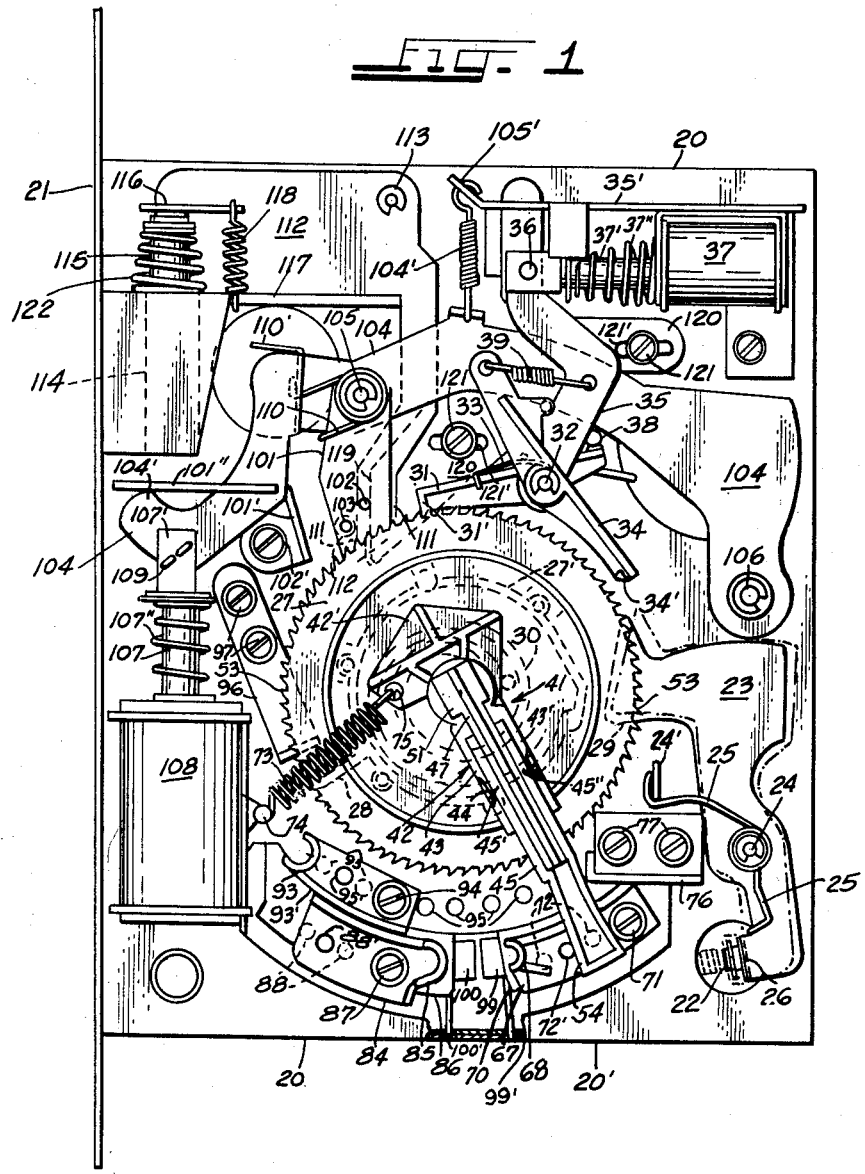
FIG. 1 is a front elevational view of our credit mechanism.

Referring more specifically to the drawings, FIG. 1 shows a frame 20 having an attaching plate 21 for mounting our credit mechanism within the cabinet of a phonograph or other coin-operated machine to be controlled thereby. The movable element of a switch which controls the associated phonograph (or other) mechanism is shown at 22 and a switch-operating lever 23, which is pivotally mounted at 24, is provided to control the position of said switch element. The lever 23 is biased in counterclockwise direction by a spring 25 which is wound around the pivot pin 24 and has one end connected to a fixed bracket 24' and its other end hooked over the lower part of the lever. When said lever is in the position shown in full lines, to which it is biased by said spring, the switch element 22 will be in its switch-closing position so as to render the phonograph operative and thus permit a selected record or records to be played. When the lever 23 is rotated in clockwise direction (when all credits have been subtracted), said switch element, which is engaged by a flange 26 on the lower end of said lever, is moved to position to open the switch so as to render the phonograph inoperative.

A rotatably mounted ratchet wheel 27 (which is adapted to be moved a number of steps corresponding to the value of deposited coins) has an integral drum portion 27' thereon which carries a switch-operating lug 28 (shown best in FIG. 6). This lug is adapted to engage the lever 23 to open the switch 22 when said ratchet is in its zero credit position. For this purpose the lever 23 has an extension 29 positioned in the path of said lug 28. When the ratchet wheel 27 is rotated in a counterclockwise direction to its zero credit position (by a subtract mechanism hereinafter described), the extension 29 is engaged by the lug 28 so as to move the lever 23 to its switch-opening position shown in dotted lines in FIG. 1 and also to prevent further counterclockwise rotation of said ratchet wheel.

When credit is to be registered by our mechanism the ratchet wheel 27 is rotated in a clockwise direction (by means hereinafter described) so as to move the lug 28 away from the extension 29 (thus permitting the lever 23 to move to the full line position of FIG. 1 and allowing the switch 22 to close); and each tooth length that the ratchet wheel is rotated in a clockwise direction from its zero credit position represents a unit of credit. A torsion spring 30 (see FIGS. 1 and 3) suitably mounted within the drum 27' on the ratchet wheel 27 serves to bias said wheel in a clockwise or credit-adding direction so as to cause it to rotate one step in that direction each time it is freed, as hereinafter explained.

The preferred embodiment herein illustrated and described is adapted to accommodate coins of four different denominations and, for purposes hereof, it will be assumed that such coins are U.S. nickels, dimes, quarters and half-dollars.

An escapement mechanism (see particularly FIGS. 1 and 4) is provided for preventing the rotation of the ratchet wheel 27 in a clockwise direction except upon deposit of proper coins. This escapement mechanism includes a pawl 31 which is pivotally mounted on a fixed pin 32 and biased by a spring 33, which is wound on said pin and has an end portion engaging over said pawl, to cause the detent (marked 31') of the pawl to engage one of the teeth on the ratchet wheel and prevent clockwise movement of the latter.

A second pawl 34 is also mounted on the pin 32 and said pin, which is affixed to the frame 20, also pivotally supports the lower end of a lever 35. The other end of said lever 35 is pinned at 36 to the plunger 37' of a solenoid 37, the latter being arranged in an electric circuit so as to be energized upon deposit of a coin in the coin mechanism (not shown) of the associated phonograph. A return spring 37" is provided on the plunger 37'. The outer end of the lever 35 moves within a slot (not shown) in a bracket 35', which serves to limit the movement of said lever in each direction.

The outer end of the holding pawl 31 carries a laterally-projecting pin 38 which engages the back edge of the lower part of the lever 35; and said lever 35 is connected to the outer end of the pawl 34 by means of a spring 39. It will be understood that when the solenoid 37 is actuated the lever 35 will be rotated in a clockwise direction (viewing FIGS. 1 and 4) about its pivot 32 and will act through the pin 38 and the spring 39, respectively, to disengage the holding pawl 31 from the ratchet wheel and cause the pawl 34, by means of a detent 34' thereon, to engage the same. It will also be apparent that upon disengagement of the detent 31' from a tooth on the ratchet wheel the wheel will move in clockwise direction until a tooth thereon is engaged by the detent 34' on the pawl 34. The pawls are so related that such coaction between them normally permits the ratchet wheel 27 to rotate one tooth length in the clockwise direction for each energization of the solenoid 37.

Thus, if the ratchet wheel were in its zero credit position holding the switch 22 open through action of the lug 28 on the extension 29 of the arm 23, actuation of the solenoid 37 by deposit of a nickel would permit said ratchet wheel to rotate one tooth length or unit by corresponding movement of the lug 28 away from the extension 29 on the arm 23 so as to permit the switch 22 to close. In this instance only one unit of credit would be established since rotation of the ratchet wheel 27 one tooth length in the counterclockwise direction would again cause the switch 22 to be opened and the associated phonograph to be rendered inoperative.

The ratchet wheel 27 is rotatably mounted on a bearing stud 40 (see FIG. 3) and rotatably mounted on said stud is a detent assembly indicated generally at 41 (see FIGS. 1 and 3), which is adapted to be interengaged with the teeth on the ratchet wheel so as to be carried along with the wheel when the latter is permitted to rotate in a clockwise direction.

The detent assembly 41 comprises three principal elements: One is a base carrier member 42 which is rotatably mounted on the bearing stud 40 and has an enlarged head 42' on one side of said stud and a channeled portion, including two outstanding channel walls 43 and 43' on the other side of said stud; the second element comprises an intermediate channeled arm 45 which is pivotally mounted on a pin 44 extending between the channel walls 43 and 43' of the carrier member 42 and through outstanding channel walls or lugs 45' and 45" on said arm 45, said arm having an extended outer end 54 and being biased outwardly from the member 42 by a compression spring 46 interposed between the members 42 and 45 (see FIG. 3); and the third element comprises an outer arm 47 which is also pivotally mounted on the cross pin 44 within the channeled portions of the member 42 and arm 45 and the outer end of which is biased outwardly from the arm 45 by a compression spring 48 interposed between the arms 45 and 47.

An intermediate part 49 of the arm 47 surmounts a flat projecting surface portion 50 on the member 45, while the other end 51 of said arm is enlarged and flattened and overlies the outer end of a slidable center pin 40' extending lengthwise through the bearing stud 40.

Figure 3:
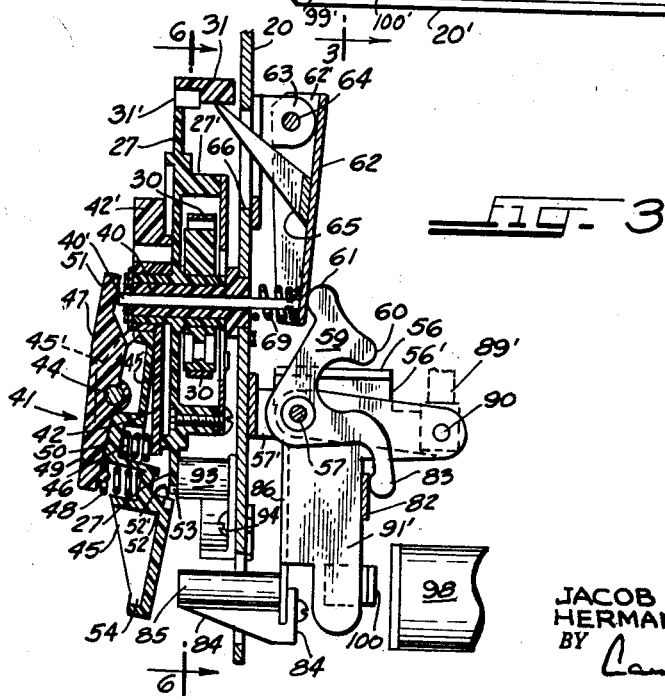
FIG. 3 is a sectional and elevational view taken along the line 3—3 of FIG. 2.

The pin 40' is adapted to be moved to the left so as to pivot the arm 47, which in turn causes the extended arm 45 to be pivoted, in a counterclockwise direction about the cross pin 44 (viewing FIG. 3). An inwardly offset portion 52 of the arm 45 carries a pair of teeth at 52' and when said arm is thus pivoted said teeth mesh with teeth (marked 53) on the ratchet wheel, whereby the detent assembly 41 is adapted to be interengaged with said ratchet wheel and rotated therewith at certain times (as hereinafter described).

As will later be more fully explained the simultaneous rotation of the detent assembly 41 and the ratchet wheel 27 permits the use of a plurality of stop means which cooperate with the outer end 54 of the member 45 of the detent assembly to control the amount of advancement of the ratchet wheel according to the value of a deposited coin.

A solenoid 55 (see FIG. 2) is adapted to be energized by a dime inserted in the coin control mechanism (not shown). A flat horizontal plate 56 is pivotally supported, by downwardly-turned flanges 56' (see FIG. 3) at or near each of its ends, on a fixed rod 57 carried by frame lugs 57' (see FIGS. 3 and 6). A bifurcated end portion 55" of the plunger 55' of the solenoid 55 is connected to a forwardly-extending arm 56" on one of the flanges 56' by a cotter pin 58, whereby upward movement of said plunger through energization of solenoid 55 will cause the plate 56, which normally rests on a fixed stop plate 58', to pivot about the rod 57 in a counterclockwise direction (viewing FIG. 3). A return spring 55''' is provided on the plunger 55'.

A bell crank 59, which is also pivotally mounted on the rod 57, has a nose portion 60 which is adapted to be engaged by the plate 56 and an opposing nose portion 61 which is positioned to engage a plate member 62. Said plate member 62 is pivotally mounted on the frame 20 by means of a pair of ears 63 (see FIGS. 3 and 6) on said frame, and a pin 64 extending between said ears and through flange portions 62' and 62" on said plate member. The slidable pin 40' is carried on the plate 62 and when the lower part of the latter is moved inwardly (to the left, viewing FIG. 3) said pin is moved to the left, whereby the arm 47 and, through it, the arm 45 of the detent assembly 41 are pivoted on the pin 44 and the teeth 52' on the arm 45 are engaged with the teeth 53 on the ratchet wheel 27 and the detent assembly is thus locked to the ratchet wheel in the manner hereinabove described.

A finger 65, which is carried by the plate member 62, projects through an opening 66 in the frame 20 so as to engage the holding pawl 31 and move the same away from the teeth of the ratchet wheel when the plate 62 is moved inwardly, permitting the ratchet wheel to be rotated in a clockwise direction (viewing FIG. 1) by the spring 30.

A plurality of stop members are mounted in the path of the outer end 54 of the arm 45 of the detent assembly 41.

The first of such stop members is shown at 67 (see FIGS. 1 and 6). It has a projecting portion 68 thereon which is normally positioned in the path of said outer end 54 of the arm 45 so that, upon energization of solenoid 55, the ratchet wheel 27 will be released by the pawl 31 and, with the detent assembly 41, will rotate until the detent arm 45, 54 engages the member 68. De-energization of the solenoid 55 permits the plate 62 and the pin 40' to be returned to their original positions by means of a compression spring 69 extending between the lower end of said plate and the frame 20, whereupon the detent assembly 41 is disengaged from the ratchet wheel 27 and the holding pawl 31 again engages the teeth of the wheel, locking the latter in the position to which it has been rotated.

The stop member 67, 68 is carried on a pivotally mounted support member 70 (see FIGS. 2 and 6) by means of a screw 71, and it will be noted that said member 70 has a plurality of screw holes 72 therein and the stop member 67 is provided with a second screw hole 72' so as to permit adjustments of the position of said stop member 67. In the illustrated embodiment of the invention the stop member 67 is mounted so as to permit the ratchet wheel 27 to rotate the distance of two teeth in a clockwise direction and thus two credits are registered upon deposit of a dime.

When the detent assembly 41 is disengaged from the ratchet wheel 27 it is returned to its original position by means of a spring 73 which has one end affixed to the frame 20 at 74 and its other end affixed to the head 42' of the detent element 42 at 75 (see FIG. 1). The detent assembly is shown in FIG. 1 in its initial position, wherein it abuts against a fixed stop member 76 which is connected to the frame 20 by means of screws 77.

A solenoid 78 (see FIG. 2) is adapted to be energized upon deposit of a quarter. This solenoid has a plunger 78' which has a bifurcated end portion 78" that is connected by a cotter pin 79 to an end wing portion 80 of the pivoted support 70 above mentioned. A return spring 78''' is mounted on the plunger 78'. Said support 70 is rotatably mounted on the rod 57 by means of the end wing 80 and a second wing 81 at the opposite end of such support 70, whereby upon energization of solenoid 78 the support 70 will be rotated about said rod and the stop 67, 68 will thus be moved out of the path of the detent assembly 41. The wing 81 on the support 70 has a projection 82 thereon which engages an arm 83 of the bell crank 59 (see FIG. 3) so as to rotate the latter about the rod 57 when the member 70 is pivoted inwardly to withdraw the stop 67, 68 from the path of the detent element 45, 54. Such rotation of the bell crank 59, through actuation of the plate 62, etc., causes the detent assembly 41 to engage the teeth of the ratchet wheel 27 and releases the holding pawl 31 therefrom in the manner described above in connection with the operation of solenoid 55 and its related elements.

It will thus be understood that energization of the solenoid 78 by deposit of a quarter will effect clockwise rotation of the ratchet wheel 27 and detent assembly 41 and in this instance, since the projection 68 on the stop member 67 will not lie in the path of the detent element 45, 54, the ratchet wheel and detent assembly will rotate until the extension 54 on the detent element 45 engages a second stop member 84, which has a projection 85 that projects into the path thereof (see FIGS. 1, 3 and 6).

The stop member 84 is affixed by means of a screw 87 to a support member 86, which is also pivoted on the rod 57, and it will be noted that the support 86, like the support 70, is provided with a plurality of screw holes 88 and the stop member 84 is provided with a second screw hole 88' so as to permit various adjustments of the position of said stop member 84. For example, it might be desirable in some instances to mount the stop member 84 so as to provide five credits for a quarter, while in other instances it might be preferred that said stop be mounted so as to provide six or more credits and such adjustability makes this change possible.

Figure 2:
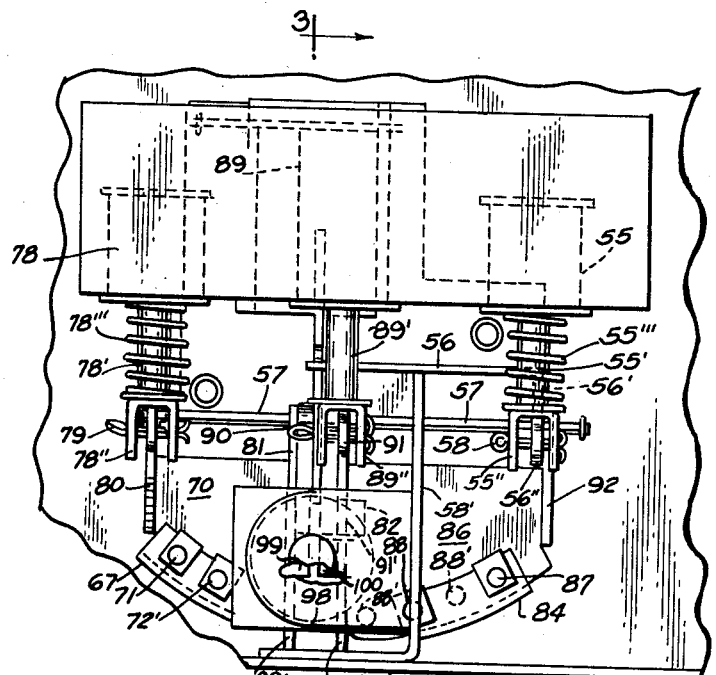
FIG. 2 is a fragmentary rear elevational view thereof.

A solenoid arranged to be energized upon deposit of a half-dollar is shown at 89 (see FIG. 2). The solenoid 89 has a plunger 89' which has a bifurcated end portion 89" that is connected by means of a cotter pin 90 to an inwardly extending arm 91 on the support member 86. The support member 86 is pivotally mounted on the rod 57 by means of the arm 91 and an end wing 92, whereby energization of the solenoid 89 will cause the support member 86 to be rotated about said rod 57 and in this manner the stop member 84 will be moved inwardly and out of the path of the arm 45, 54 of the detent assembly 41.

It is important to note that the projection 82 which is integral with the movable support 70 overlaps an inwardly extending wing 91' which is integral with the arm 91 on the movable support 86, so that when the latter is rotated it will effect rotation of the support 70 as well as the support 86. Such rotation of the support members 70 and 86 moves both the stop members 67, 68 and 84, 85 out of the path of the detent and also causes the detent assembly 41 to engage the teeth of the ratchet wheel 27 and releases the holding pawl 31 (as described hereinabove in connection with the operation of the solenoids 55 and 78).

It will now be understood that energization of the solenoid 89 upon deposit of a half-dollar will effect clockwise rotation of the ratchet wheel 27 and detent assembly 41 and, in this instance, since both of the stop projections 68 and 85 are moved out of the path of the arm 54 of the detent element 45, the ratchet wheel and detent assembly will rotate until said arm 54 on the detent element 45 engages a projection 93 on a fixed stop member 93' which is mounted on the frame 20 by means of a screw 94. It will be noted that the frame 20 is provided with a plurality of screw holes 95 and the stop member 93 is provided with a second screw hole 95' (see FIG. 1) so as to permit various adjustments of the position of said fixed stop member 93'. For example in one case it might be desirable to mount the stop member 93' so as to provide twelve credits for a half-dollar, whereas in other instances it might be preferred that 13 or more credits be established.

As hereinabove described the drum portion 27' of the ratchet wheel 27 carries a lug 28 for actuating the switch-operating lever 23. A fixed abutment 96 (see FIGS. 1 and 6) is provided on the frame 20, to which it is attached by screws 97, so as to engage the lug 28 at a predetermined position of the ratchet wheel and thus limit the maximum number of credits which can be accumulated by the mechanism. In the embodiment herein shown and described the abutment 96 is positioned so that a maximum of 30 credits can be accumulated at one time.

As shown in FIGS. 2 and 3, an electromagnet 98 is provided in the lower part of the device and angle pieces 99 and 100, which are of paramagnetic material, are attached to the lower parts of the wing portions 81 and 91' of the stop support members 70 and 86, respectively. When the support member 70 is rotated about the rod 57 so as to move the stop 67, 68 out of the path of the detent assembly 41, the piece 99 engages the face of the electromagnet 98 and will be held thereto to hold said support member 70 in its displaced position after de-energization of the solenoid 78. In a similar manner the magnet 98 will act upon the piece 100 so as to hold the support 86 in its displaced position after the de-energization of the solenoid 89.

It will be understood that the purpose of the magnet 98 and the pieces 99 and 100 is to extend the time during which the stops 67, 68 and 84, 85 are held out of the path of the detent assembly 41 so as to assure that the detent assembly and ratchet wheel 27 will have sufficient time to rotate the full number of units corresponding to the value of a deposited coin. A condenser 98' (see FIG. 7) may be provided to energize the electromagnet at the appropriate time and of course such a condenser may be designed to provide energization of the magnet for a predetermined time, so as to effect whatever time delay is desired.

Incidentally the angle pieces 99 and 100 have or may have tail portions 99' and 100', respectively, which extend downwardly into slots (not shown) in the bottom wall, marked 20', of the supporting frame 20 to limit the stroke of the movable stop supports 70 and 86, with which said pieces, respectively, are rigid.

Reference is now made to FIGS. 1 and 5 for illustration of the mechanism which is provided for rotating the ratchet wheel 27 in the counterclockwise direction so as to subtract credits when value is received by a customer. For example, assuming the mechanism of this invention is being utilized in conjunction with an automatic phonograph it will usually be desired to subtract one or more units of credit each time a musical selection is made by a customer. For this purpose a subtract pawl 101 is provided. This pawl carries two pins, 102 and 103, on its front surface, which pins are arranged to engage two teeth on the ratchet wheel when the pawl is actuated. Said pawl 101 is pivotally mounted on an arm 104 by means of a pin 105. The arm 104 as shown extends substantially the width of the frame 20 and has one end pivotally mounted on said frame by means of a pin 106. The other end is connected to a bifurcated portion 107' of the plunger 107 of a subtract solenoid 108 by a cotter pin 109. A return spring 107" is provided on the plunger 107.

The solenoid 108 is arranged to be energized upon the selection and playing of a record. When so energized it causes rotation of the arm 104 about its pivot 106 so as to move the subtract pawl on a downward stroke, causing the pins 102 and 103 to engage spaced teeth on the ratchet wheel and rotate the latter in a counterclockwise direction (viewing FIGS. 1 and 5). Upon de-energization of solenoid 108 the arm 104 is returned to its original position by a tension spring 104' which is connected to a fixed support 105'.

It will be understood that the number of credits which are subtracted on each operation of the pawl 101 will depend not only upon the extent of downward movement of the pawl but also upon its angular position with respect to the ratchet wheel 27. A fixed stop bracket 101' comprising an angle piece attached to the frame 20 by a screw 102' is provided to limit the stroke of said pawl 101. Said bracket has a horizontal plate portion 101" which is slotted to receive the left hand portion (viewing FIGS. 1 and 5) of the arm 104 and the extreme left end of said arm 104 has an upturned nose portion 104' which abuts against the bottom of said plate portion 101" to limit the upward movement of said arm 104.

As shown in FIGS. 1 and 5, the pawl 101 is positioned so that upon energization of solenoid 108 the ratchet wheel will be rotated two tooth positions in the counterclockwise direction, although of course the arrangement could be such that the wheel will be rotated only one tooth position.

The pawl 101 is biased in a counterclockwise direction (viewing FIGS. 1 and 5) by means of a torsion spring 110, one end of which is engaged with a bracket 110' on the arm 104 and the other end of which is hooked over the left edge of the pawl, and said pawl is held in the position shown by means of an arm 111 (shown best in FIG. 5) which engages a pin 112 mounted on the back surface of the pawl. It will thus be understood that as long as the arm 111 is in the position shown the pawl 101 will be adapted, as shown, to subtract two units of credit upon each energization of the solenoid 108.

The arm 111 is integral with a plate 112' which is pivotally mounted on the frame 20 by means of a pin 113. A multi-pricing solenoid 114 has a plunger 115 (see FIG. 1) normally positioned to engage a horizontal ledge 116 which is integral with said plate 112'. The member 116 is connected to a fixed support 117 by means of a tension spring 118. When the solenoid 114 is energized its plunger is moved downwardly so as to permit the tension spring 118 to rotate the plate 112' about its pivot 113, thus moving the arm 111 to the right (viewing FIGS. 1 and 5) and permitting the pawl 101 to rotate in a counterclockwise direction. The pawl 101 will so rotate until the pin 112 thereon engages the edge 119 of a fixed stop plate 120 which is adjustably mounted on the frame 20 by means of headed screws 121 extending through slots 121' in said plate.

When the solenoid 114 is de-energized its plunger 115 will be moved upwardly by a compression spring 122 so as to engage the ledge 116 and return the plate 112 and arm 111 to their original positions.

It will be understood that when the pawl 101 is permitted to abut against the fixed edge 119 of the plate 120 through energization of the multi-pricing solenoid 114, said pawl will be positioned to subtract a larger number of credits upon energization of the subtract solenoid 108 inasmuch as it will engage the ratchet wheel 27 at a higher point and will have a longer effective stroke. In the embodiment herein shown and described, the fixed plate 120 is positioned so that when the pawl 101 abuts against it the subsequent stroke of the pawl will cause the ratchet wheel 27 to be rotated a distance of three teeth in the counterclockwise direction.

Where both regular and long playing records are available for selection in an automatic phonograph the solenoid 114 is arranged to be actuated in case of selection of a long playing record and such energization is timed to precede the energization of the subtract solenoid 108 whereby more units of credit will be subtracted than in the case of a short playing record.

Referring now to the schematic wiring diagram of FIG. 7, the nickel, dime, quarter and half dollar add coils or solenoids 37, 55, 78 and 89 are arranged to be energized, respectively, by coin switches 123, 124, 125 and 126 which are in series with said coils, respectively, and with a 25 volt A.C. power source 127.

Since the momentary closure of a coin switch can be for as short a time as forty milliseconds, additional time for the quarter and half dollar add operations is provided for, as above pointed out, by means of the hold magnet 98, which is shown in the diagram as connected to a double throw switch 128 having contacts T and S. As shown the condenser 98' is normally connected through the contacts T with a D.C. power source 129 (normally of approximately 30 to 40 volts) and is thus charged to the source voltage.

When the quarter or half dollar add solenoid (78 or 89) is energized, mechanical means (not shown) operate the switch 128 to close the contacts S, whereupon the condenser 98' discharges through the hold magnet 98 and the discharge current sets up a magnetic field. The angle piece 99 on the movable stop support plate 70 (in case of a quarter add operation) and also the angle piece 100 on the movable stop support plate 86 (in case of a half dollar add operation), when moved into contact with the pole piece of said hold magnet 98, will be magnetically held thereto, thus maintaining one or both of said stop support plates, as the case may be, in displaced position (with the stop thereon out of the path of the detent arm 45, 54) until the condenser 98' discharges, even though the coin switch has opened.

In the particular scheme shown in the diagram, the switch 22 comprises contacts $e$ which are open in the 0 and 1 credit positions of the ratchet wheel 27 and contacts $b$ which are open in the 0, 1 and 2 credit positions of the wheel. Thus in this illustration two credits are required for a "single" or short-playing selection and three for a long-playing selection. Of course a one-and-two (instead of a two-and-three) credit pricing provision, as above described, or other desired provision, could be substituted by a suitable rearrangement of said switch 22.

In the case of single selection, the subtract coil 108 is energized by having sufficient credit to close the contacts $e$ and by closing a single subtract start switch 131. In the same operation a normally open switch 132 is closed, completing a write-in selector circuit 132', and thereafter a normally open switch 133 is closed to energize a timing relay 134. This opens a normally closed switch 135 and deenergizes the subtract coil 108. As the subtract mechanism returns to its normal rest position, the switch 133 is opened to drop out the timing relay 134, permitting the switch 135 to close.

In the case of selection of a long playing record, the coil 114 is energized by having sufficient credits (three or more) to close the contacts *b* as well as the contacts *e* and by closing a long-play subtract start switch 136. Energization of the coil 114 closes contacts of a switch 137 (which is operated by the pivotal movement of the plate 112′), thus energizing the subtract solenoid 108 through contacts *e* of switch 22, and the contacts of switch 135. The remaining operation is the same as in the case of a single selection, as above described.

This invention can, of course, be applied in various ways and the present description should, therefore, be regarded as disclosing only an illustrative embodiment from which no unnecessary limitations should be implied.

We claim:

1. A credit mechanism for use in coin-controlled, electrically-operated machines, comprising: a control switch biased toward its closed position; an add-subtract ratchet wheel having means thereon for causing the opening of said switch at the start position of the wheel, said wheel being biased to rotate in a direction away from said switch-opening position to establish and add credit upon such rotation; a holding pawl for engaging said wheel to normally prevent its rotation in said direction; a detent device normally disconnected from said ratchet wheel and having a movable element engageable with the teeth of said wheel to cause said detent device to rotate with the wheel when said element is so engaged as hereinafter specified; coin-controlled means for disengaging said holding pawl and for causing said detent device to engage said ratchet wheel; a plurality of credit-limit stops mounted in different positions circumferentially of the ratchet wheel and so disposed as to be in the path of movement of said detent device when the latter is engaged with the ratchet wheel but out of such path when such device is disengaged, at least one of said stops being retractably mounted; coin-controlled means for moving said retractable stop out of the path of said detent device when a coin of a value calling for a plurality of credits is inserted in the machine; subtract means for returning said ratchet wheel to its switch-opening position with a step movement for each operation of the machine corresponding to a unit of credit; and means for disengaging said detent device from said ratchet wheel and for returning it to its initial position, out of the plane of said stops, prior to such return movement of the ratchet wheel.

2. A credit mechanism for use in coin-controlled, electrically-operated machines, comprising: a control switch biased toward its closed position; an add-subtract ratchet wheel having means thereon for causing the opening of said switch at the start position of the wheel, said wheel being biased to rotate in a direction away from said switch-opening position to establish and add credit upon such rotation; a holding pawl for engaging said wheel to normally prevent its rotation in said direction; a detent device normally disconnected from said ratchet wheel and having a movable element engageable with the teeth of said wheel to cause said detent device to rotate with the wheel when said element is so engaged as hereinafter specified; coin-controlled means for disengaging said holding pawl and for causing said detent device to engage said ratchet wheel; a plurality of credit-limit stops mounted in different positions circumferentially of the ratchet wheel and so disposed as to be in the path of movement of said detent device when the latter is engaged with the ratchet wheel but out of such path when such device is disengaged, at least one of said stops being retractably mounted; coin-controlled means for moving said retractable stop out of the path of said detent device when a coin of a value calling for a plurality of credits is inserted in the machine; subtract means for returning said ratchet wheel to its switch-opening position with a step movement for each operation of the machine corresponding to a unit of credit; and means for disengaging said detent device from said ratchet wheel and for returning it to its initial position, out of the plane of said stops, prior to such return movement of the ratchet wheel; at least one of said stops being adjustably mounted whereby its position may be readily changed to vary the credit established by insertion of a coin of the value adapted to cause rotation of the ratchet wheel to the position in which said detent device engages such stop.

3. A credit mechanism for use in coin-controlled, electrically-operated machines, comprising: a control switch biased toward its closed position; an add-subtract ratchet wheel having means thereon for causing the opening of said switch at the start position of the wheel, said wheel being biased to rotate in a direction away from said switch-opening position to establish and add credit upon such rotation; a holding pawl for engaging said wheel to normally prevent its rotation in said direction; a detent device normally disconnected from said ratchet wheel and having a movable element engageable with the teeth of said wheel to cause said detent device to rotate with the wheel when said element is so engaged as hereinafter specified; coin-controlled means for disengaging said holding pawl and for causing said detent device to engage said ratchet wheel; a plurality of credit-limit stops mounted in different positions circumferentially of the ratchet wheel and so disposed as to be in the path of movement of said detent device when the latter is engaged with the ratchet wheel but out of such path when such device is disengaged, at least two of said stops being retractably mounted; individual coin-controlled means associated with each said retractable stop for moving the same out of the path of said detent device, such individual means being selectively operable according to the value of the coin inserted in the machine; subtract means for returning said ratchet wheel to its switch-opening position with a step movement for each operation of the machine corresponding to a unit of credit; and means for disengaging said detent device from said ratchet wheel and for returning it to its initial position, out of the plane of said stops, prior to such return movement of the ratchet wheel.

4. A credit mechanism for use in coin-controlled, electrically-operated machines, comprising: a control switch biased toward its closed position; an add-subtract ratchet wheel having means thereon for causing the opening of said switch at the start position of the wheel, said wheel being biased to rotate in a direction away from said switch-opening position to establish and add credit upon such rotation; a holding pawl for engaging said wheel to normally prevent its rotation in said direction; a detent device normally disconnected from said ratchet wheel and having a movable element engageable with the teeth of said wheel to cause said detent device to rotate with the wheel when said element is so engaged as hereinafter specified; coin-controlled means for disengaging said holding pawl and for causing said detent device to engage said ratchet wheel; a plurality of credit-limit stops mounted in different positions circumferentially of the ratchet wheel and so disposed as to be in the path of movement of said detent device when the latter is engaged with the ratchet wheel but out of such path when such device is disengaged, at least two of said stops being retractably mounted; individual coin-controlled means associated with each said retractable stop for moving the same out of the path of said detent device, such individual means being selectively operable according to the value of the coin inserted in the machine; subtract means for returning said ratchet wheel to its switch-opening position with a step movement for each operation of the machine corresponding to a unit of credit; and means for disengaging said detent device from said ratchet wheel and for returning it to its initial position, out of the plane of said stops, prior to such return movement of the ratchet wheel; at least one of said stops being adjustably mounted whereby its position may be readily changed to vary the credit established by insertion of a coin of the value adapted to cause rotation of the ratchet wheel to the position in which said detent device engages such stop.

5. A credit mechanism of the type set forth in claim 4 wherein each of said retractable stops is carried by a separate movable support member and the last one of said stops is mounted on a fixed support member, at least part of said stops being adjustably mounted on their respective support members so as to permit adjustment of their respective positions to thus vary the credit which each such adjustably-mounted stop permits to be established when in operative position.

6. A credit mechanism for use in coin-controlled, electrically-operated machines comprising: a control switch biased toward its closed position; an add-subtract ratchet wheel having means thereon for causing the opening of said switch in the start position of the wheel, said wheel being biased to rotate in a direction away from said switch-opening position to establish and add credit upon such rotation; an escapement mechanism normally engaging said ratchet wheel to prevent its rotation in said direction, said mechanism being adapted upon actuation to permit said ratchet wheel to rotate a predetermined amount in said direction; means for actuating said escapement mechanism; a detent device normally disconnected from said ratchet wheel and having a movable element engageable with the teeth of said wheel to cause said detent device to rotate with the wheel when said element is so engaged as hereinafter specified; coin-controlled means for disengaging said escapement mechanism and for causing said detent device to engage said ratchet wheel so as to be moved thereby; a plurality of stops independently mounted in respective positions in the path of forward movement of said detent device, at least two of said stops being retractably mounted; individual coin-controlled means each associated with one of said retractable stops for moving the same out of the path of said detent device, said individual means being selectively operable according to the value of the coin inserted in the machine; subtract means for returning said ratchet wheel to its switch-opening position with a step movement for each operation of the machine corresponding to a unit of credit; and means for disengaging said detent device from said ratchet wheel and for returning said device to its initial position, out of the plane of said stops, and for reengaging said escapement mechanism with said wheel, prior to such return movement of the ratchet wheel.

7. A credit mechanism for use in coin-controlled electrically-operated machines comprising: a control switch biased toward its closed position; an add-subtract ratchet wheel having means thereon for causing the opening of said switch in the start position of the wheel, said wheel being biased to rotate in a direction away from said switch-opening position to establish and add credit upon such rotation; an escapement mechanism normally engaging said ratchet wheel to prevent its rotation in said direction, said mechanism being adapted upon actuation to permit said ratchet wheel to rotate a predetermined amount in said direction; a detent device normally disconnected from said ratchet wheel and having a movable element engageable with the teeth of said wheel to cause said detent device to rotate with the wheel when said element is so engaged as hereinafter specified; at least three stops independently mounted in respective positions in the path of forward movement of said detent device, at least two of said stops being retractably mounted; first actuating means for actuating said escapement mechanism; second actuating means for disengaging said escapement mechanism and for causing said detent device to engage said wheel so as to be moved thereby to the first of said three stops upon insertion of a coin of minimum usable denomination; third actuating means for disengaging said escapement mechanism, retracting the first of said stops out of the path of said detent device, and for causing said detent device to engage said ratchet wheel so as to be moved thereby to the second of said three stops upon insertion of a coin of the next higher usable denomination in the machine; and fourth actuating means for disengaging said escapement mechanism, retracting both of said movable stops out of the path of said detent device, and for causing said detent device to engage said ratchet wheel so as to be moved thereby to the last one of said three stops upon insertion of a coin of still higher denomination in the machine; subtract means for returning said ratchet wheel to its switch-opening position with a step movement for each operation of the machine corresponding to a unit of credit; and means for disengaging said detent device from said ratchet wheel and for returning it to its initial position, out of the plane of said stops, prior to such return movement of the ratchet wheel.

8. A credit mechanism for use in coin-controlled, electrically-operated machines, comprising: a control switch biased toward its closed position; an add-subtract ratchet wheel having means thereon for causing the opening of said switch at the start position of the wheel, said wheel being biased to rotate in a direction away from said switch-opening position to establish and add credit upon such rotation; a holding pawl for engaging said wheel to normally prevent its rotation in said direction; a detent device normally disconnected from said ratchet wheel and having a movable element engageable with the teeth of said wheel to cause said detent device to rotate with the wheel when said element is so engaged as hereinafter specified; coin-controlled means for disengaging said holding pawl and for causing said detent device to engage said ratchet wheel; a plurality of credit-limit stops mounted in different positions circumferentially of the ratchet wheel and so disposed as to be in the path of movement of said detent device when the latter is engaged with the ratchet wheel but out of such path when such device is disengaged, at least one of said stops being retractably mounted; coin-controlled means for moving said retractable stop out of the path of said detent device when a coin of sufficient value to establish credit in excess of that which would be permitted if said retractable stop were not retracted is inserted in the machine; electromagnetic means for holding such retractable stop in its retracted position during advancing movement of said ratchet wheel; subtract means for returning said ratchet wheel to its switch-opening position with a step movement for each operation of the machine corresponding to a unit of credit; and means for disengaging said detent device from said ratchet wheel and for returning it to its initial position, out of the plane of said stops, prior to such return movement of the ratchet wheel.

9. A credit mechanism for use in coin-controlled, electrically-operated machines, comprising: a control switch biased toward its closed position; an add-subtract ratchet wheel having means thereon for causing the opening of said switch at the start position of the wheel, said wheel being biased to rotate in a direction away from said switch-opening position to establish and add credit upon such rotation; a holding pawl for engaging said wheel to normally prevent its rotation in said direction; a detent device normally disconnected from said ratchet wheel and having a movable element engageable with the teeth of said wheel to cause said detent device to rotate with the wheel when said element is so engaged as hereinafter specified; coin-controlled means for disengaging said holding pawl and for causing said detent device to engage said ratchet wheel; a plurality of credit-limit stops mounted in different positions circumferentially of the ratchet wheel and so disposed as to be in the path of movement of said detent device when the latter is engaged with the ratchet wheel but out of such path when such device is disengaged, at least one of said stops being retractably mounted; coin-controlled means for moving said retractable stop out of the path of said detent device when a coin of a value calling for a plurality of credits is inserted in the machine; subtract means, including a subtract pawl and actuating means therefor, for returning said ratchet wheel to its switch-opening position with a step movement for each operation of the machine corresponding to a unit of credit; means for disengaging said detent device from said ratchet wheel and for returning it to its initial position, out of the plane of said stops, prior to such return movement of the ratchet wheel; and means for varying the angular position of said subtract pawl with respect to the ratchet wheel so as to vary the effective stroke of such pawl and thus the amount of credit subtracted upon each actuation thereof.

10. A credit mechanism for use in coin-controlled, electrically-operated machines, comprising: a control switch; an add-subtract ratchet wheel having means thereon for causing opening and closing of said switch, said wheel being rotatable in one direction to establish credit and in reverse direction to subtract credit in the operation of the mechanism; a holding pawl for engaging said wheel to normally prevent its rotation in credit-establishing direction; a detent device normally disconnected from said ratchet wheel and having a movable connecting element engageable with the teeth of said wheel to cause said detent device to rotate with the wheel during rotation of the latter in credit-establishing direction, said device being mounted to overlie the face of the wheel and having a stop-engaging element protruding in general radial direction from the periphery of said wheel, said last-mentioned element being movable toward and away from the face of the wheel to dispose the same in stop engaging or stop clearing position, respectively, as hereinafter specified; coin-controlled means responsive to the insertion of a coin in the machine for disengaging said holding pawl from said wheel and for causing said movable connecting element of said detent device to move to its wheel engaging position and said stop-engaging element to move to its stop-engaging position; a plurality of credit-limit stops mounted in different circumferential positions adjacent the ratchet wheel and so disposed as to be normally in the path of movement of said stop-engaging element when the same is in its stop-engaging position; subtract means for returning said ratchet wheel toward its switch-opening position with a step rotation in a direction opposite to said credit-establishing direction, one step for each operaton of the machine corresponding to a unit of credit; and means for disengaging said connecting element from the wheel causing said stop-engaging element to move in a direction away from the face of said ratchet wheel and out of the plane of said stops prior to such return movement of the wheel.

11. A credit mechanism for use in coin-controlled, electrically-operated machines, comprising: a control switch; and add-subtract ratchet wheel having means thereon for causing opening and closing of said switch, said wheel being rotatable in one direction to establish credit and in reverse direction to subtract credit in the operation of the mechanism; a holding pawl for engaging said wheel to normally prevent its rotation in credit-establishing direction; first coin-controlled means for disengaging said holding pawl and causing said wheel to rotate in credit-establishing direction; a plurality of credit-limit stops mounted in different circumferential positions adjacent the ratchet wheel, at least one of said stops being retractably mounted; stop-engaging means movable with said ratchet wheel and arranged to engage one or another of said stops, depending on the value of the coin inserted in the machine, upon rotation of the wheel in credit-establishing direction; second coin-controlled means for moving said retractable stop out of the path of said stop-engaging means as a result of the insertion in the machine of a coin of higher value than that required to establish a basic unit of credit; electromagnetic means for holding said retractable stop in its retracted position during advancing movement of the ratchet wheel in response to the insertion of such higher value coin; time delay means for causing said electromagnetic means to hold said retractable stop in its retracted position for a longer time than the same would otherwise be held by said electromagnetic means, to thereby permit adequate time for movement of said ratchet wheel to the extent necessary to establish credit corresponding to said higher value coin; subtract means for returning said ratchet wheel toward its switch-opening position by step rotation in direction opposite to said credit-establishing direction; and means for causing movement of said stop-engaging means during such return movement of the wheel to a position providing clearance between the same and the normal unretracted position of said retractable stop.

References Cited in the file of this patent
UNITED STATES PATENTS 2,974,772    Zeigle et al. _____ Mar. 14, 1961